July 5, 1960  A. G. JANUS  2,943,944
WRAPPED BREAD AND CLOSURE THEREFOR
Filed Dec. 8, 1955

INVENTOR.
ALEXANDER G. JANUS
BY
Williamson, Schroeder,
Adams + Meyers
ATTORNEYS

United States Patent Office 2,943,944
Patented July 5, 1960

2,943,944

WRAPPED BREAD AND CLOSURE THEREFOR

Alexander G. Janus, Rochester, Minn., assignor to Consumers Merchandising Corporation, Rochester, Minn., a corporation of Minnesota Filed Dec. 8, 1955, Ser. No. 551,868

5 Claims. (Cl. 99—173)

This invention relates to a device for maintaining wrapped bread in proper condition for serving directly from its wrapper.

It is a general object of the invention to provide a device which will cooperatively form a closed package together with the conventional wrapper of a loaf of pre-sliced bread at all times between periods of actual removal of the individual slices of bread.

It is another object of the invention to provide a device having means to close off the open end of a wrapped loaf of bread and to expose temporarily a new slice of bread when it is desired to remove the same and thereby to prevent the formation of unpalatable dry surfaces on the bread.

Another object of the invention is to provide a holder and closure for pre-sliced bread as it is progressively dispensed from its wrapper together with means associated with the holder and closure to permit easy removal of excess wrapper material as the slices of bread are removed.

A still further object of the invention is to provide an inexpensive and efficient device of the class described which has a pleasing appearance in attached condition on a loaf of bread and which renders practical the serving of bread upon a table directly from its wrapper.

These and other objects and advantages of my invention will more fully appear from the following description, made in connection with the accompanying drawings, wherein like reference characters refer to the same parts throughout the several views and in which.

Figure 1:
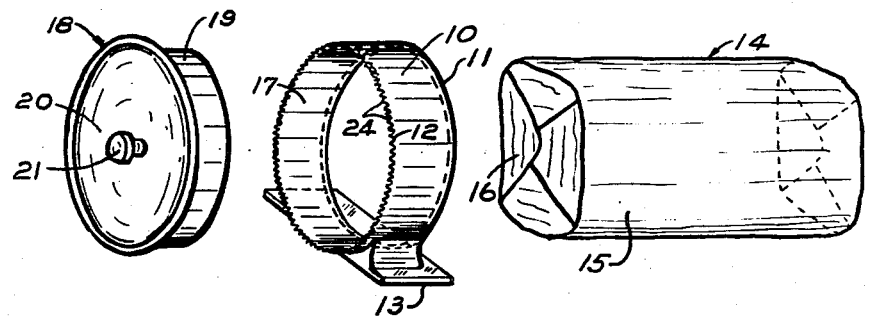
Figure 1 is an exploded perspective view of my device aligned with an unopened loaf of wrapped bread preparatory to unwrapping and inserting in the device.

With continued reference to the drawing, Fig. 1 shows an exploded view of my device with a conventional loaf of wrapped and sliced bread positioned in alignment with the device. The device has a ring element or collar 10 in band form so as to present a rear edge 11 and a forward edge 12, as shown. The ring or collar 10 may have a slight convergent taper inwardly from the forward edge 12 to be rearward edge 11 or may be untapered so as to form a short cylindrical member. Ring or collar 10 constitutes a closed annular member which can be perfectly round or may be formed to fit generally the contour of a conventional loaf of bread. The ring or collar 10 is principally secured to a base member 13 which is preferably of small height so as to be retained on a horizontal supporting surface without appreciably elevating the ring or collar 10. The axis of the ring or collar 10 is intended to lie substantially hoirzontal and parallel to the surface of base 13.

Figure 2:
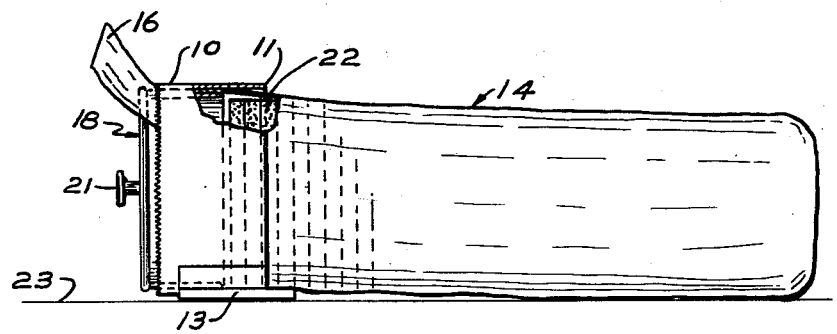
Figure 2 is a side elevation of the device in closed position with the opened end of a bread wrapper inserted between the elements, portions of the device and the bread wrapper being torn away to better show the relationship of the parts.

The conventional loaf of bread is indicated at 14 which is provided, in turn, with a wrapper element 15 having folded and overlapped end pieces 16, as shown in Fig. 1. The wrapper is generally waterproofed as by waxing and may constitute several thicknesses of paper or similar material. The folded portions 16 are opened at one end of the loaf when it is desired to remove slices of bread and the opened wrapper end is then inserted into the ring or collar 10 past the rear edge 11 and forwardly of the forward edge 12, as shown in Fig. 2. Where the collar 10 conforms to the contours of the loaf of bread 14, my collar member is interfitted closely with the outer surface of the wrapper end and, if the collar is perfectly round, then the circumference of the inner annular surface 17 of the collar 10 should be substantially equivalent to the circumference of the bread wrapper 15 at the outer surface thereof.

A closure 18 in the form of a flanged cap has an outer peripheral rim surface 19 which is adapted to interfit within the outer extending end 16 of bread wrapper 15 and press against the inner annular surface 17 so as to form a sealed engagement therewith. A transverse area across the peripheral rim 19 is completely closed by the solid disc 20 and the latter may be provided with a manual handle or knob 21, as shown. The peripheral rim or flange 19 may be so shaped as to interfit closely with the annular inner surface 17 of the collar 10 and, if the latter has a slight degree of taper, it is preferred that the peripheral rim or flange 19 have the same taper so that the cap may interfit closely with said collar.

When the cap or closure is inserted within the extending wrapper end 16 and against the collar 10, the device has the appearance of that shown in Fig. 2. Bread slices 22 lie adjacent the rearward edge 11 of collar 10 and the remainder of the bread loaf 14 will lie in horizontal position rearwardly of the device and may rest on surface 23 which also supports the base 13, as shown in Figs. 2 and 3.

An important feature of my invention is the provision of a sharp tearing means which may take the form of sharp teeth or serrations 24 associated with the forward edge 12 of the collar 10. The open end of the bread wrapper 15 will lie beyond the edge 12 and excess wrapper can be deeply torn out at the edge 12 by pressing against the serrations or teeth 24. Removal of the excess wrapper does not affect the sealing or positioning of the flanged cap closure 18 and bread slices 22 will remain in fresh condition for a relatively long period of time without resealing or folding the open end of the bread wrapper.

From the foregoing, it will be obvious that the device and loaf of bread may be placed directly upon a table and bread slices 22 removed therefrom, as desired. The cap or closure 18 is simply removed, one or more bread slices 22 pulled forwardly through the ring and open end of the wrapper, following which the loaf 14 is advanced within the collar 10 until the first remaining slice lies adjacent the rear edge 11 of the collar 10. The newly formed excess wrapper material 16 will then be firmly pressed against the collar by inserting the flanged cap or closure 18 which seals and wedges the wrapper material as previously described. The newly formed excess wrapper 16 is then again torn off by pressing against the sharp teeth or serrations 24 and tearing around the complete periphery of the wrapper.

Figure 3:
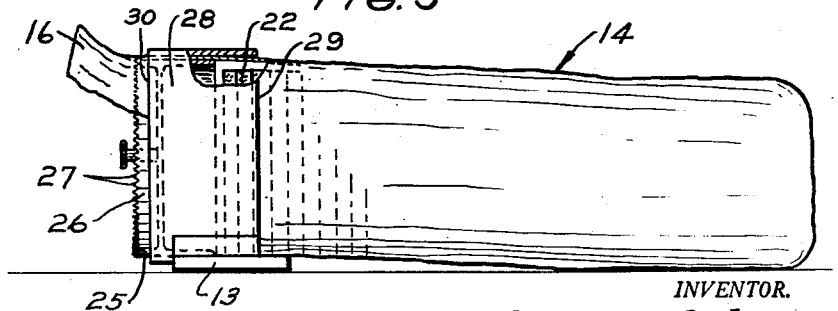
Figure 3 is a view similar to that shown in Figure 2 with an alternate form of tearing edge.

In the alternate form shown in Fig. 3, the pressing cooperation between the flanged cap or closure member 25 has a peripheral rim 26 terminating outwardly in sharp teeth or serrations 27, as shown. The collar or ring element 28 may have plain edges 29 at the rear and 30 at the fore, as shown. When the open wrapper end 16 is inserted in collar 28, the flanged cap or closure element 25 is inserted within the wrapper and against the inner annular surface of the collar 28, as previously described. In the case of the alternate form shown in Fig. 3, however, the cutting or tearing edge 27 is formed on the closure member rather than on the collar member. In the latter instance, the excess wrapper material 16 is pressed inwardly past the serrated tearing edge 27 in order to discard the unsightly excess wrapper material. As before, the cap or closure remains in closed condition during the tearing process and at all other times except when a loaf of bread 22 is removed from loaf 14. In either of the forms shown in Figs. 2 and 3, the cutting or tearing edge is closely adjacent the interfitting surfaces and at the forward edge so as to provide means for tearing away the excess wrapper material which extends forwardly of the device.

It may thus be seen that I have devised a simple and novel device which is adapted to close the open end of a diminishing loaf of wrapped bread and, at the same time, provide means for tearing off the excess and unsightly wrapper. The efficiency and neatness of the invention makes the serving of bread directly from its wrapper a useful expedient and the objectionable appearance of a partially used loaf of bread has been eliminated by my invention.

It will, of course, be understood that various changes may be made in the form, details, arrangement and proportion of the parts without departing from the scope of my invention.

What I claim is:

1. An assemblage for maintaining wrapped and presliced bread in easily dispensed and fresh condition, said assemblage comprising, a ring element having an inner annular surface, an opened loaf of wrapped bread having a portion of its wrapped material extending beyond the last exposed slice of bread at an opened end thereof and passing through said ring, a closure having a peripheral outer rim surface interfitting within the extending portion of said wrapper material and pressing outwardly against the inner annular surface of the ring element in frictional engagement therewith, and tearing means disposed closely adjacent the wrapper whereby excess wrapper material extending beyond the tearing means may be manually torn off thereagainst while leaving bread within the remaining wrapper in sealed and fresh condition.

2. An assemblage for maintaining wrapped and presliced bread in easily dispensed and fresh condition, said assemblage comprising, a ring element having an inner annular surface, an opened loaf of wrapped bread having a portion of its wrapper material extending beyond the last exposed slice of bread at an opened end thereof and passing through said ring element, a closure having a peripheral outer rimmed surface interfitting within the extended portion of wrapper material and frictionally engaged in outwardly pressing relation against said wrapper and the inner annular surface of the ring element, and a sharp tearing edge disposed on at least one of said ring elements and said closure adjacent the interfitting area of the annular surface and the rim surface, whereby excess wrapper extending beyond the sharp tearing edge may be torn off thereagainst and discarded.

3. An assemblage for maintaining wrapped and presliced bread in easily dispensed and fresh condition comprising, a collar having a rear edge and a forward edge, an opened loaf of wrapped bread having a portion of its wrapper material extending beyond the last exposed slice of bread and the open end thereof and passing completely through said collar, a flanged cap removably interfitted with said collar and wedging against said wrapper material, and a sharp tearing edge disposed on at least one of said forward collar edge and said flange cap against which that portion of the wrapper extending beyond said forward edge may be torn away and discarded while preserving the freshness of the wrapped bread.

4. An assemblage for maintaining wrapped and presliced bread in fresh condition, said device comprising, a collar having a rear edge and a front edge, an opened loaf of wrapped bread having a portion of its wrapper material extending beyond the last exposed slice of bread at the open end thereof and passing through said collar, a flanged cap removably wedged in closed relation inside the extending portion of said wrapper material in interfitting relation with said collar, and a serrated cutting edge formed on at least one of said front edge of the collar and the periphery of said flanged cap, whereby excess wrapper material extending beyond the serrated edge may be torn off thereagainst and discarded.

5. An assemblage for maintaining wrapped and presliced bread in easily dispensed and fresh condition comprising, a base member adapted to lie on a supporting surface, a ring element secured to said base and having an inner annular surface, an opened loaf of wrapped bread having a portion of its wrapper material extending beyond the last exposed slice of bread at the open end thereof, and passing through said ring element while supported on a surface co-planar with that of the supporting base, a closure member removably inserted within the extending portion of wrapper material and interfitted against said inner annular surface of the ring element, and a sharp tearing edge disposed on at least one of said ring element and said closure adjacent the interfitting area of said ring element and said closure member, whereby excess wrapper material extending beyond the sharp tearing edge may be torn off thereagainst and discarded while the closure member maintains the bread within the wrapper in fresh and sealed relation with the outer atmosphere.

References Cited in the file of this patent

UNITED STATES PATENTS

| | | |
|---|---|---|
| 787,021 | Biber | Apr. 11, 1905 |
| 1,391,253 | Horning | Sept. 20, 1921 |
| 2,508,481 | Allen | May 23, 1950 |
| 2,639,031 | Fuchs | May 19, 1953 |

FOREIGN PATENTS

| | | |
|---|---|---|
| 224,414 | Great Britain | Nov. 13, 1924 |